(12) United States Patent
Scheer et al.

(10) Patent No.: US 8,186,901 B2
(45) Date of Patent: May 29, 2012

(54) LIFTGLASS TO STRUT RETENTION DEVICE WITH BUILT-IN LOCKING FEATURE

(75) Inventors: Del W. Scheer, Oxford, MI (US); Kelly J. Harris, Lawrenceburg, TN (US); Mary M. Inman, Harrison Township, MI (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 1090 days.

(21) Appl. No.: 11/734,802

(22) Filed: Apr. 13, 2007

(65) Prior Publication Data

US 2007/0248404 A1 Oct. 25, 2007

Related U.S. Application Data

(60) Provisional application No. 60/791,870, filed on Apr. 13, 2006.

(51) Int. Cl.
*F16C 11/06* (2006.01)

(52) U.S. Cl. ............................................ 403/77; 403/201

(58) Field of Classification Search .................... 403/68, 403/71, 76, 77, 78, 161, 197, 201, 243, 258, 403/259, 260, 261, 369, 370, 408.1; 411/338
See application file for complete search history.

(56) References Cited

U.S. PATENT DOCUMENTS

| | | | | |
|---|---|---|---|---|
| 2,524,652 A | * | 10/1950 | Dalley | 403/161 |
| 5,040,917 A | * | 8/1991 | Camuffo | 403/408.1 |
| 5,144,861 A | * | 9/1992 | Nishijima et al. | 403/261 |
| 5,540,514 A | * | 7/1996 | Demars et al. | 403/76 |
| 6,632,056 B1 | * | 10/2003 | Lind | 411/107 |
| 6,768,058 B2 | * | 7/2004 | Pallapothu | 16/2.1 |
| 6,941,721 B2 | * | 9/2005 | Lind | 52/786.13 |
| 7,555,818 B2 | * | 7/2009 | Erskine et al. | 24/305 |

FOREIGN PATENT DOCUMENTS

EP 0 801 201 * 10/1997

OTHER PUBLICATIONS gb.espacenet.com. European Patent Office translation: EP 0 801 201.*

* cited by examiner

*Primary Examiner* — Michael P Ferguson
(74) *Attorney, Agent, or Firm* — Gifford, Krass, Sprinkle, Anderson & Citkowski, P.C.; Kevin S. MacKenzie; Dean B. Watson

(57) ABSTRACT

An inline strut retention assembly includes a glass sheet having first and second surfaces and a single hole formed through the first and second surfaces. An isolator is positioned proximate the first surface of the glass sheet. The isolator includes a keyed slot formed therein. A ball stud member includes a threaded shaft extending in one direction and a post extending in an opposing direction. The threaded shaft extends through the keyed slot formed in the isolator. An attachment button is positioned proximate the second surface of the glass sheet. The attachment button includes a ferrule portion having an inner surface receiving the threaded shaft of the ball stud member and an outer surface shaped to mate with the keyed slot of the isolator preventing rotation of the attachment button relative to the isolator.

15 Claims, 3 Drawing Sheets

LIFTGLASS TO STRUT RETENTION DEVICE WITH BUILT-IN LOCKING FEATURE

CROSS REFERENCE TO RELATED APPLICATIONS

This application claims priority of U.S. Provisional Patent Application Ser. No. 60/791,870 filed Apr. 13, 2006 which is incorporated herein by reference.

FIELD OF THE INVENTION

The invention relates to retention devices and with more particularity to retention devices for attaching a strut to glass.

BACKGROUND OF THE INVENTION

Prior art retention devices for mounting components to glass often include multiple components that are pieced together and require complex assembly operations. The assembly operations often include operations that are not able to be controlled in a repeatable manner. Such operations may lead to torque fall off when assembling the components and accidental disengagement of the components after they have been installed. Additionally, prior art retention devices may require a glass piece having a figure eight shaped slot cut into the glass piece to prevent rotation of the retention device relative to the glass. Such figure eight shaped slots are costly to form in the glass and require additional forming operations.

Typical prior art retention devices are not easy to assemble and service after installation and do not provide an isolation of stress applied to a glass piece to avoid breakage. There is therefore a need in the art for a retention device that solves the above limitations of the prior art retention devices.

SUMMARY OF THE INVENTION

In one aspect there is disclosed an inline strut retention assembly including a glass sheet having a single attachment hole. A ball stud member is adapted to connect with an inline strut. An anti-rotation isolator is positioned in the single attachment hole. The anti-rotation isolator spaces the ball stud member from the glass sheet.

In another aspect there is disclosed an inline strut retention assembly including a glass sheet having a single circular attachment hole. A ball stud member is adapted to connect with an inline strut. An isolator is positioned in the single circular attachment hole. The isolator prevents rotation of the inline strut retention assembly.

In another aspect there is disclosed an inline strut retention assembly including a glass sheet having first and second surfaces and a single hole formed through the first and second surfaces. An isolator is positioned in the single hole of the glass sheet. The isolator includes a keyed slot formed therein. A ball stud member includes a threaded shaft extending in one direction and a post extending in an opposing direction. The threaded shaft extends through the keyed slot formed in the isolator. An attachment button is positioned proximate the second surface of the glass sheet. The attachment button includes a ferrule portion having an inner surface receiving the threaded shaft of the ball stud member and an outer surface shaped to mate with the keyed slot of the isolator preventing rotation of the attachment button relative to the isolator.

DETAILED DESCRIPTION OF THE PREFERRED EMBODIMENTS

Figure 1:
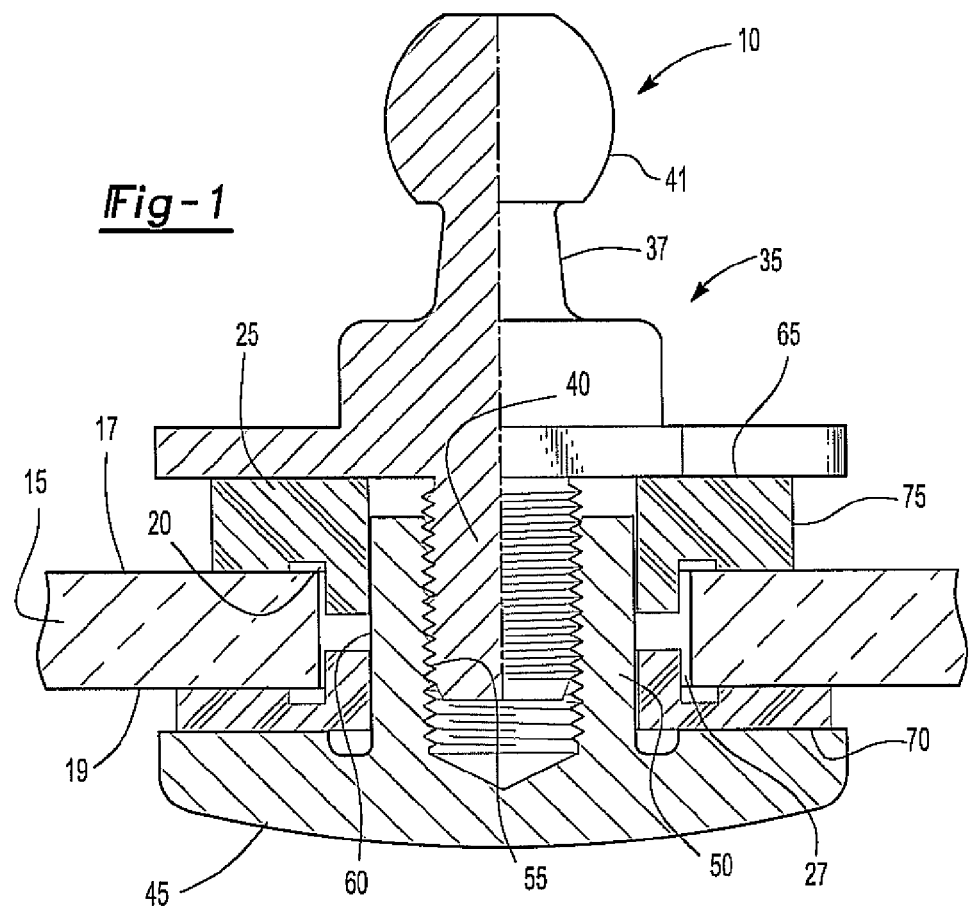
FIG. 1 is a sectional view of the retention assembly assembled to a sheet of glass.

Referring to FIG. 1 there is shown a retention assembly 10 according to one embodiment. The retention assembly 10 includes a glass sheet 15 having first and second opposing surfaces 17, 19. A single hole 20 is formed through the first and second surfaces 17, 19 of the glass sheet 15. An isolator 25 is positioned in the single hole 20 of the glass sheet 15. The isolator 25 includes a keyed slot 30 formed therein. A ball stud member 35 has a threaded shaft 40 extending therefrom and is positioned within the keyed slot 30 formed in the isolator 25. An attachment button 45 is positioned proximate the second surface 19 of the glass sheet 15. The attachment button 45 includes a ferrule portion 50 having an inner surface 55 receiving the threaded shaft 40 of the ball stud member 35. The ferrule portion 50 also includes an outer surface 60 shaped to mate with the keyed slot 30 of the isolator 25 preventing rotation of the attachment button 45 relative to the isolator 25.

Figure 3:
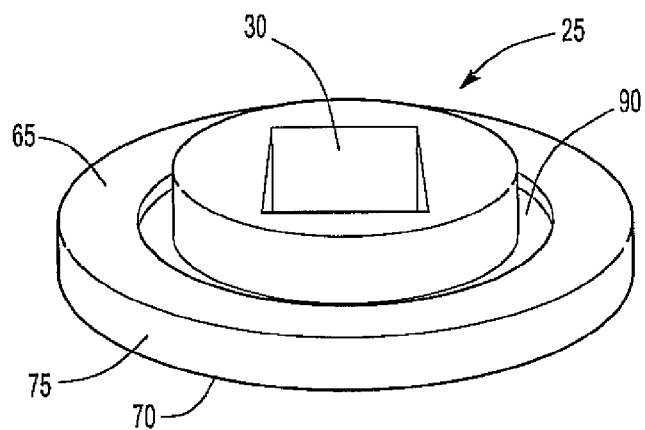
FIG. 3 is a perspective view of an isolator.
Figures 4A, 4B:
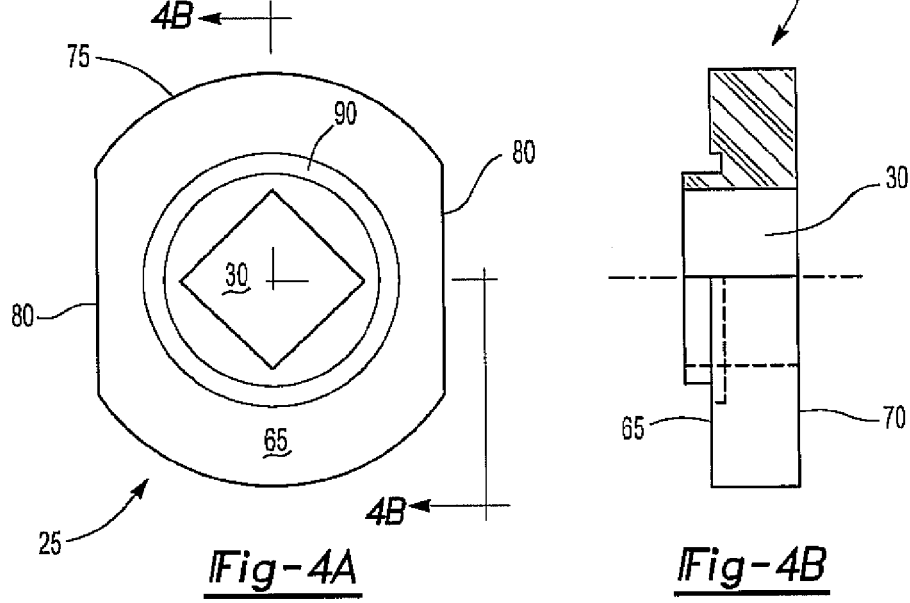
FIGS. 4A and B is a top and side view of an isolator.
Figure 5:
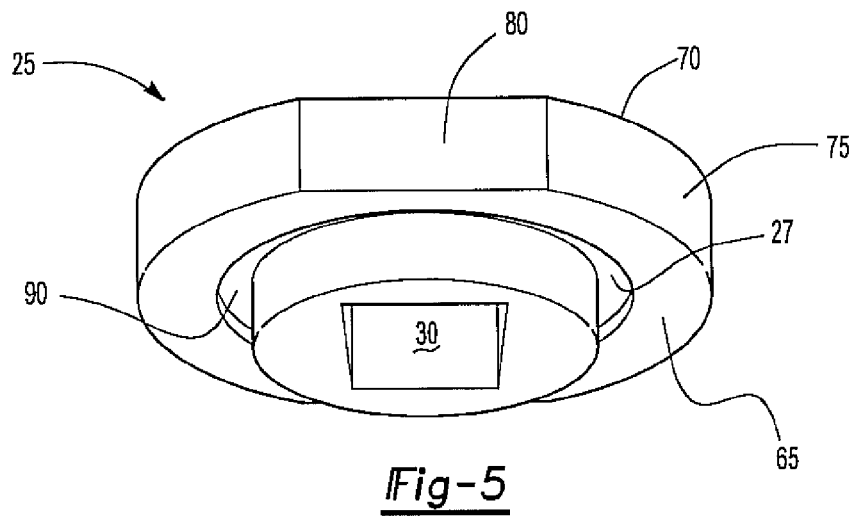
FIG. 5 is a perspective view of an isolator.

Referring to FIGS. 3, 4 and 5, there is shown the isolator 25. The isolator 25 includes opposing first and second surfaces 65, 70 bounded by a side surface 75. The side surface 75 includes two flattened sections 80 for assembling the retention assembly 10, as will be discussed in more detail below. The keyed slot 30 is formed through the first and second surfaces 65, 70 in a central portion of the isolator 25. As can be seen in the figures, the keyed slot 30 includes a square shape, although other key shapes may be utilized by the present invention. A counter bore or depression 90 may be formed in the first surface 65 of the isolator 25 to position the ball stud member 35 when assembled. As best seen in FIG. 1, the glass sheet 15 is retained in a channel 27 defined by the isolator 25 to protect the edge of the glass sheet 15.

Figure 2:
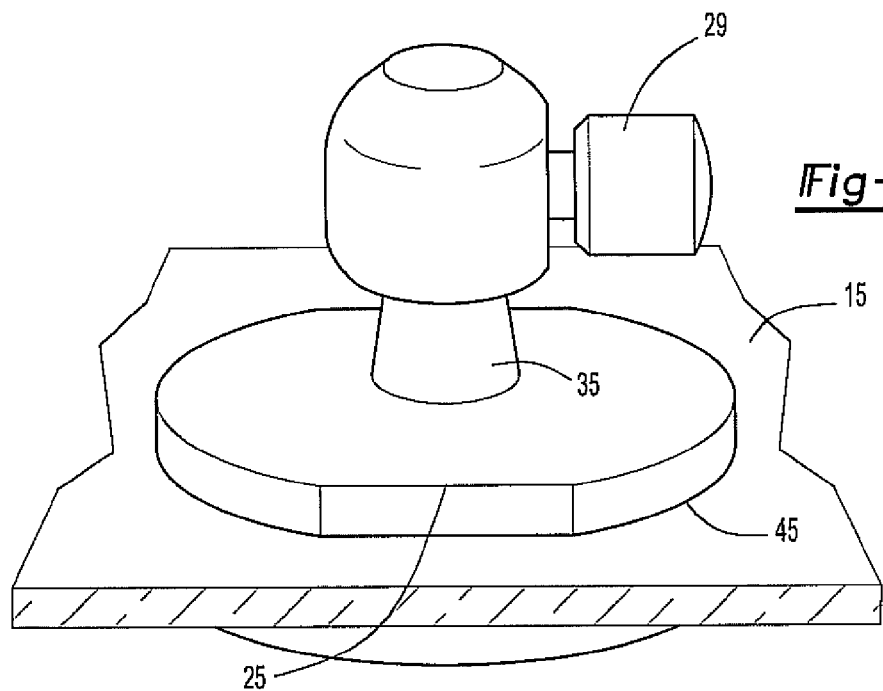
FIG. 2 is a perspective view of the retention assembly assembled to a sheet of glass.
Figure 7:
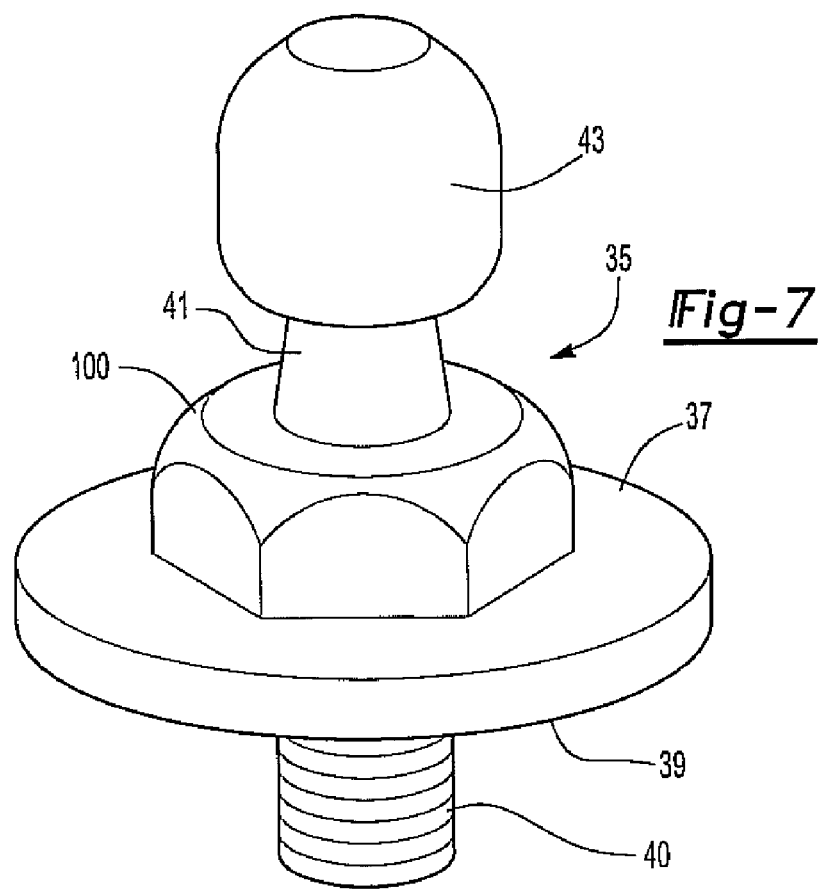
FIG. 7 is a perspective view of a ball stud member.

Referring to FIG. 7, there is shown the ball stud member 35. The ball stud member 35 includes a base 37 having a bottom surface 39 that mates with the first surface 65 of the isolator 25. A post 41 extends from the base 37 and includes a ball stud attachment portion 43 for attaching a strut member, as shown in FIG. 2. The threaded shaft 40 extends from the bottom surface 39 of the base 37 in an opposing direction to the post 41.

Figure 6:
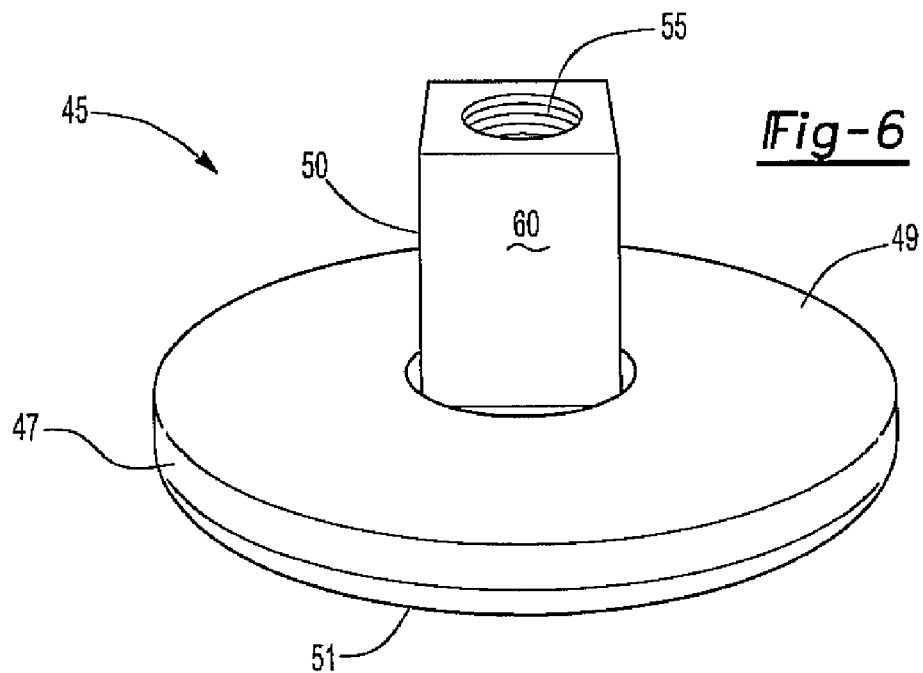
FIG. 6 is a perspective view of an attachment button.

Referring to FIG. 6, there is shown the attachment button 45. The attachment button 45 includes a base portion 47 and a ferrule portion 50 extending from the base portion 47. The ferrule portion 50 includes an inner surface 55 that receives the threaded shaft 40 of the ball stud member 35. Additionally, the ferrule portion 50 includes an outer surface 60 that is shaped to mate with the keyed slot 30 of the isolator 25. In one aspect, the outer surface 60 of the ferrule portion 50 includes a square shape adapted to mate with the square shape of the keyed slot 30 formed in the isolator 25. As stated above, additional shapes may be utilized by both the outer surface 60 of the ferrule portion 50 and the keyed slot 30 formed in the isolator 25. For example, additional shapes such as hexagonal, rectangular and other shapes that prevent rotation of the attachment button 45 relative to the isolator 25 may also be used. The base portion 47 of the attachment button 45 includes opposing first and second surfaces 49, 51 that extend radially outward relative to the ferrule portion 50. The first surface 49 is adapted to be positioned proximate the second surface 19 of the glass sheet 15 while the second surface 51 of the attachment button 45 includes a class A surface providing an aesthetically appearing profile.

In use, the retention assembly 10 may be assembled to a sheet of glass 15 to allow for attachment with a strut member, as shown in FIG. 2. In a first step, a single hole 20 is formed in the glass sheet 15. The single hole 20 reduces the holes formed in the glass sheet 15 in comparison to currently used strut retention assemblies wherein two slots are formed in a sheet of glass to provide for anti-rotation prongs of current devices to be positioned in both of the slots.

The isolator 25 is positioned in the hole 20 of the glass sheet 15 with the glass sheet retained in the channel 27 defined by the isolator 25. The keyed slot 30 formed in the isolator 25 is aligned with the single hole 20 formed in the glass sheet 15. The ball stud member 35 is ten positioned on top of the isolator 25 such that the threaded shaft 40 extends through the keyed slot 30 formed in the isolator 25 and also extends through the single hole 20 formed in the glass sheet 15. The ball stud post 41 extends in the opposing direction of the threaded shaft 40 and is adapted to attach to a strut member.

The attachment button 45 is positioned on the second surface 19 of the glass sheet 15. The ferrule portion 50 of the attachment button 45 extends through the single hole 20 formed in the glass sheet 15 and into the keyed slot 30 of the isolator 25. The inner surface 55 of the ferrule portion 50 is adapted to receive the threaded shaft 40 of the ball stud member 35. The outer surface 60 of the ferrule portion 50 is adapted to mate with the keyed slot 30 of the isolator 25 to prevent rotation of the attachment button 45 relative to the isolator 25. In one aspect, a washer may be positioned between the base portion 47 of the attachment button 45 and the second surface 19 of the glass sheet 15 to disperse contact forces of the attachment button 45 relative to the glass sheet 15.

Once the parts are assembled as described above, an operator may apply a wrench or socket to a hexagonal formation 100 formed on a top of the base 37 of the ball stud member 35. Additionally, the operator can apply a wrench to the flattened sections 80 of the isolator 25 and thereby apply torque to the ball stud member 35 via the hexagonal formation 100 driving the threaded shaft 40 into the inner surface 55 of the ferrule portion 50 of the attachment button 45 to securely attach the retention assembly 10 to the glass sheet 15. Applying the wrench to the flattened sections 80 of the isolator 25 prevents the isolator 25 from rotating as the torque is applied to the ball stud member 35. Additionally, the shape of the outer surface 60 of the ferrule portion 50 mates with the keyed slot 30 of the isolator 25 to prevent the attachment button 45 from rotating relative to the isolator 25 as the threaded shaft 40 is driven into the inner surface 55 of the ferrule portion 50.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. An inline strut retention assembly comprising:
a glass sheet having a single attachment hole having a uniform bore;
a ball stud member adapted to connect with an inline strut; and
an anti-rotation isolator positioned in the single attachment hole, the anti-rotation isolator contacting the glass sheet and ball stud member, spacing the ball stud member from the glass sheet, the anti-rotation isolator including a channel formed therein, the channel contacting opposing sides of the glass sheet and protecting edges of the glass sheet;
wherein the anti-rotation isolator includes opposing first and second surfaces bound by a side surface, the opposing first and second surfaces contacting the ball stud member and the glass sheet;
wherein the anti-rotation isolator includes a keyed slot formed through first and second surfaces of the anti-rotation isolator, an attachment shaft of the ball stud member passing through the keyed slot and an attachment button is positioned in the keyed slot contacting the anti-rotation isolator wherein the attachment button includes a ferrule portion that receives the attachment shaft of the ball stud member.

2. The inline strut retention assembly of claim 1 wherein the ball stud member includes a base contacting the anti-rotation isolator, the base having a post extending from the base and terminating at a ball stud attachment portion and the ball stud member including an attachment shaft extending from the base in an opposing direction to the post.

3. The inline strut retention assembly of claim 1 wherein the side surface includes flattened sections for assembling the retention assembly.

4. The inline strut retention assembly of claim 1 wherein the first surface of the anti-rotation isolator includes a counter bore for positioning the ball stud member relative to the isolator.

5. The inline strut retention assembly of claim 1 wherein the anti-rotation isolator is compressible for regulating a force applied to the glass from the ball stud member.

6. The inline strut retention assembly of claim 1 wherein the attachment button includes a base portion contacting the anti-rotation isolator and the ferrule portion extending from the base portion and through the keyed slot.

7. The inline strut retention assembly of claim 6 wherein the base portion includes a first surface separated from a second surface, the first and second surface extending radially outward relative to the ferrule portion.

8. The inline strut retention assembly of claim 7 wherein the second surface of the base portion of the attachment button is an aesthetically finished surface.

9. The inline strut retention assembly of claim 6 wherein the ferrule portion includes an inner surface adapted to mate with the attachment shaft of the ball stud member and an outer surface having a shape that mates with a shape of a keyed slot formed in the anti-rotation isolator.

10. An inline strut retention assembly comprising:
a glass sheet having a single circular attachment hole having a uniform bore;
a ball stud member adapted to connect with an inline strut; and
an isolator positioned in the single circular attachment hole, the isolator contacting the glass sheet and ball stud member, preventing rotation of the inline strut retention assembly, the isolator including a channel formed therein, the channel contacting opposing sides of the glass sheet and protecting edges of the glass sheet;
wherein the ball stud member includes a base contacting the isolator, the base having a post extending from the base and terminating at a ball stud attachment portion and the ball stud member including an attachment shaft extending from the base in an opposing direction to the post;

wherein the isolator includes a keyed slot formed through first and second surfaces of the isolator, an attachment shaft of the ball stud member passing through the keyed slot and an attachment button is positioned in the keyed slot contacting the isolator wherein the attachment button includes a ferrule portion that receives the attachment shaft of the ball stud member.

11. The inline strut retention assembly of claim 10 wherein the isolator spaces the ball stud member from the glass sheet and is compressible for regulating a force applied to the glass from the ball stud member.

12. The inline strut retention assembly of claim 10 wherein the attachment button includes a radially extending base portion and the ferrule portion extending from the base portion and through the keyed slot.

13. The inline strut retention assembly of claim 12 wherein the ferrule portion includes an inner surface adapted to mate with the attachment shaft of the ball stud member and an outer surface having a shape that mates with a shape of the keyed slot formed in the isolator.

14. The inline strut retention assembly of claim 12 wherein the base portion of the attachment button includes an aesthetically finished surface.

15. An inline strut retention assembly comprising:

a glass sheet having opposing first and second surfaces and a single hole formed through the first and second surfaces;

an isolator positioned in the hole of the glass sheet, the isolator including a keyed slot formed therein, the isolator including a channel formed therein, the channel retaining the opposing first and second surfaces of the glass sheet;

a ball stud member including a threaded shaft extending in one direction and a post extending in an opposing direction, the threaded shaft extending through the keyed slot formed in the isolator;

an attachment button positioned proximate the second surface of the glass sheet, the attachment button including a ferrule portion having an inner surface receiving the threaded shaft of the ball stud member and the ferrule portion including an outer surface shaped to mate with the keyed slot of the isolator preventing rotation of the attachment button relative to the isolator.

* * * * *